July 17, 1934.  F. H. RAGAN  1,966,969
BRAKE OPERATING MECHANISM
Filed Nov. 5, 1928  4 Sheets-Sheet 1
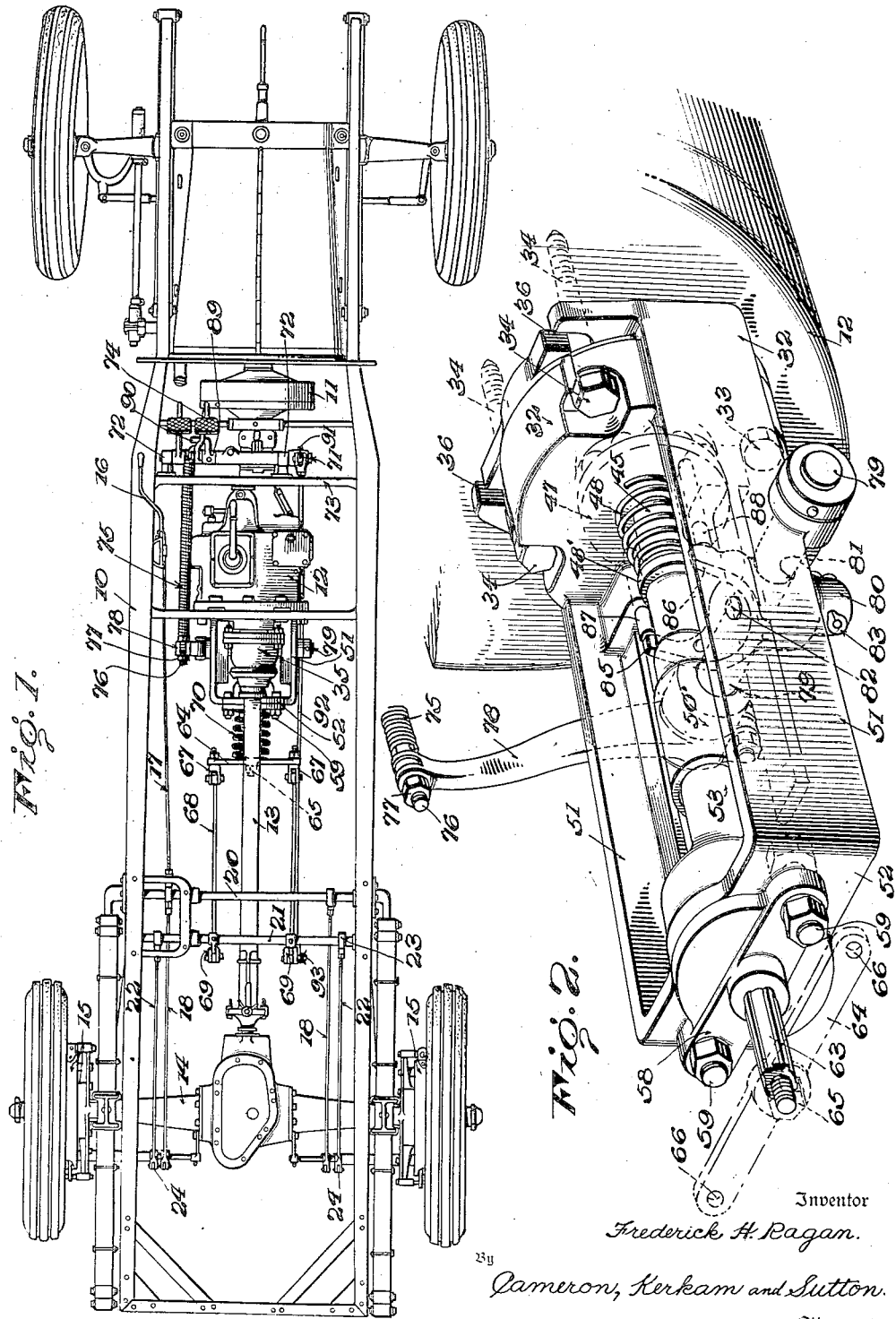
Inventor
Frederick H. Ragan.
By Cameron, Kerkam and Sutton.
Attorneys

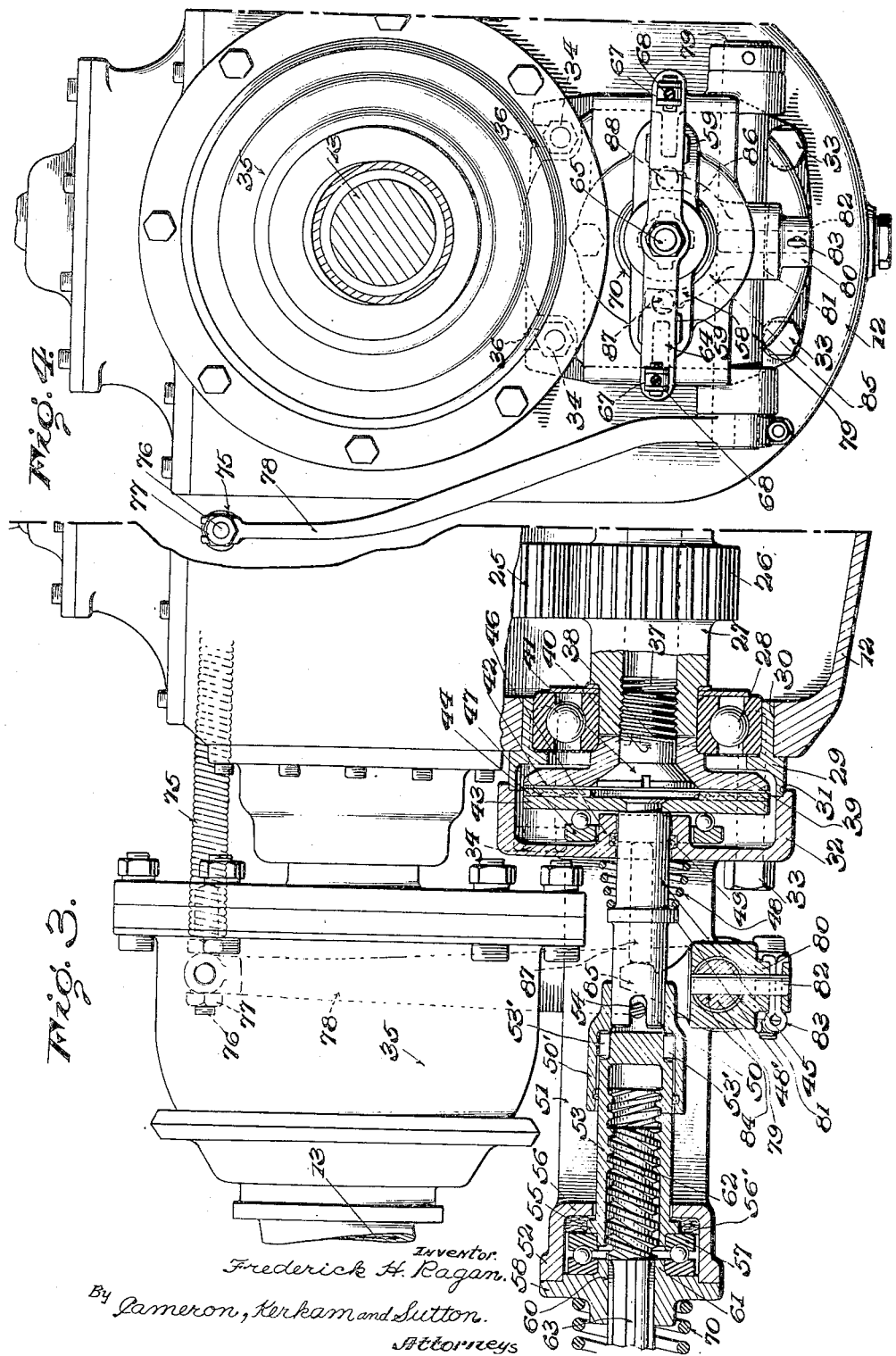

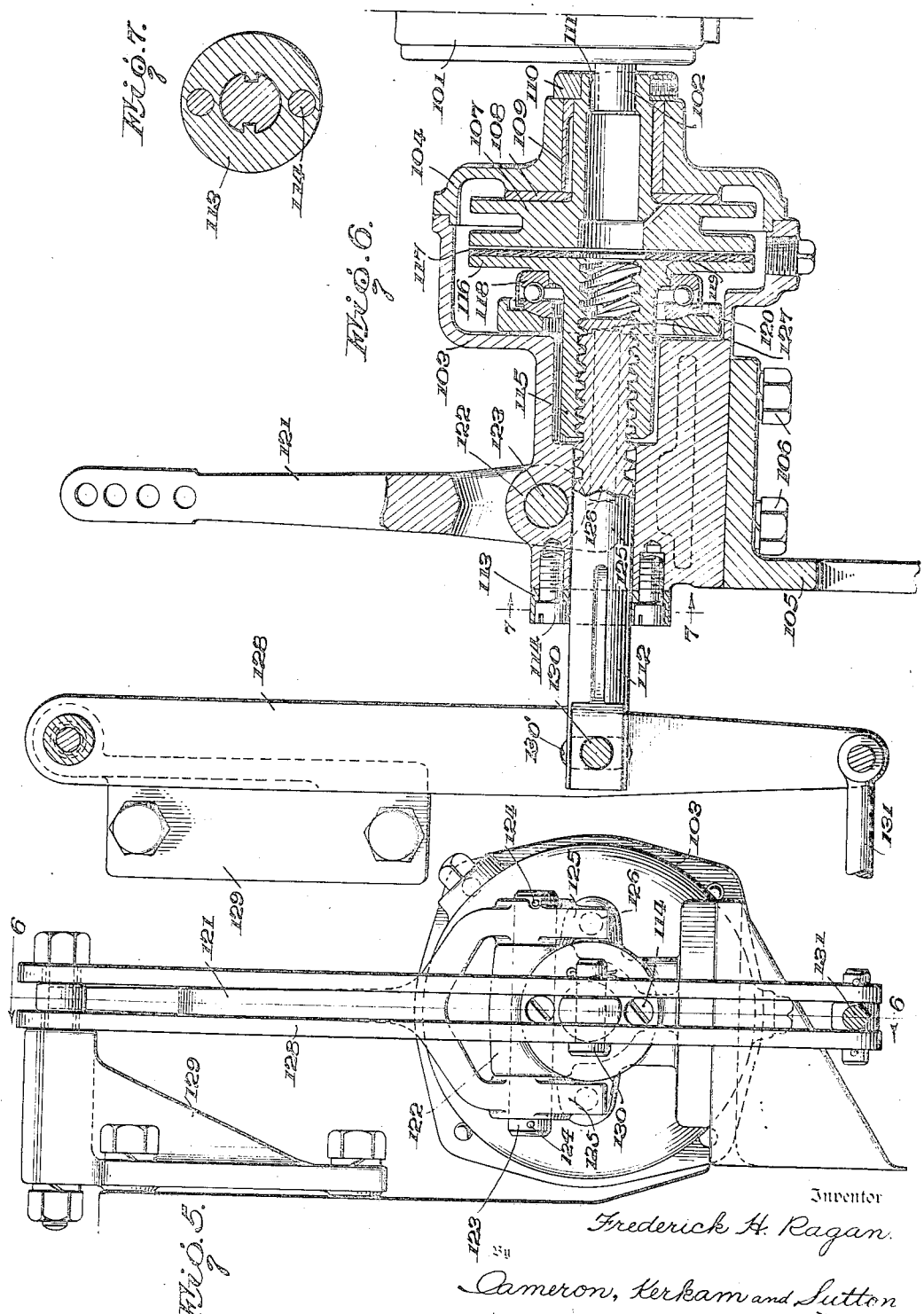

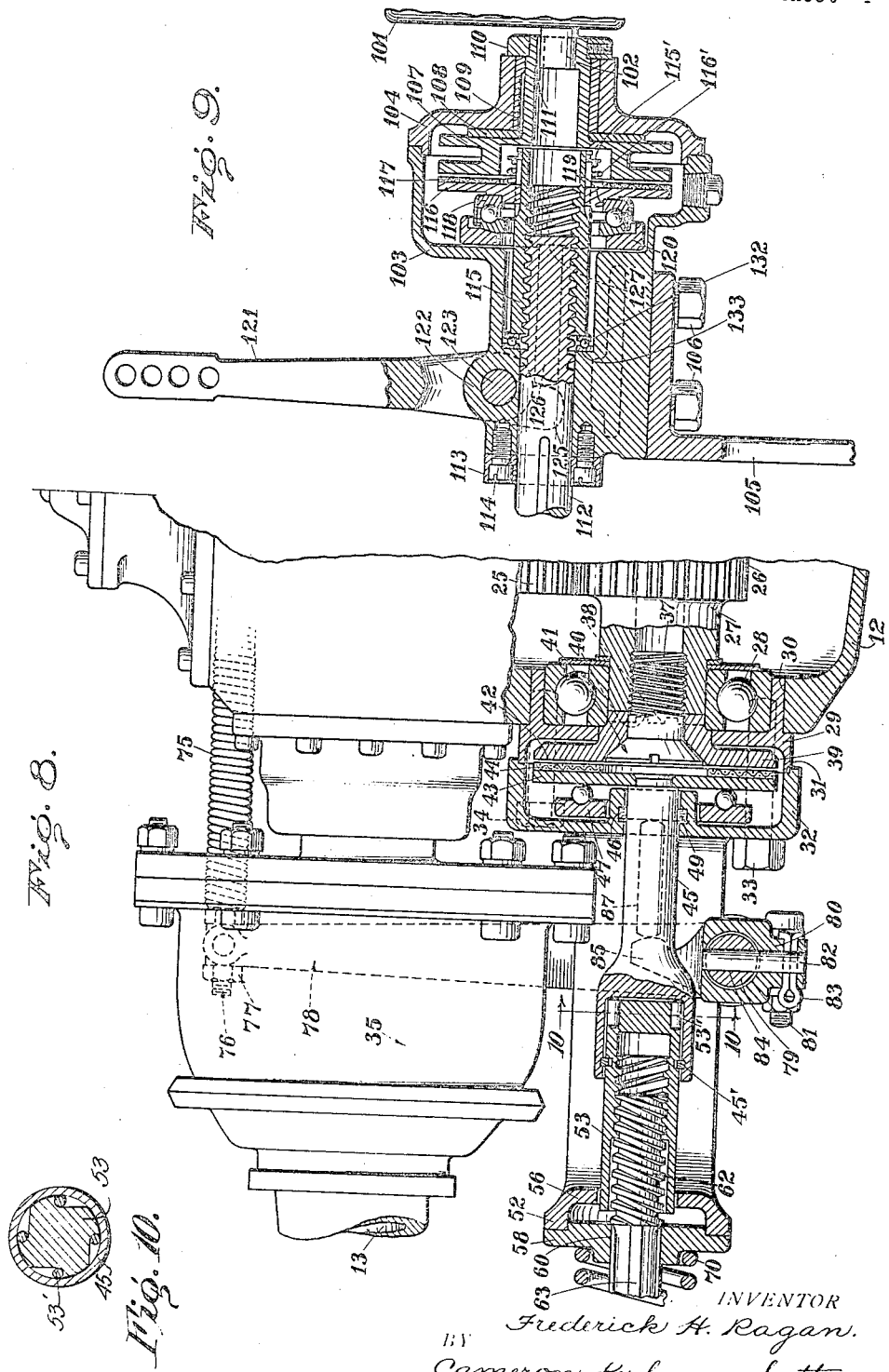

Patented July 17, 1934

1,966,969

UNITED STATES PATENT OFFICE 1,966,969

BRAKE OPERATING MECHANISM

Frederick Hathaway Ragan, Cleveland, Ohio

Application November 5, 1928, Serial No. 317,382

16 Claims. (Cl. 188—140)

This invention relates to brake mechanism for automobiles, and more particularly to a power brake operating mechanism in which the brake applying force is derived from a rotating part of the vehicle, and in which the application of such force is controlled by the operator.

An object of the present invention is to provide such a device which is powerful and dependable in action, and at all times under the positive control of the operator.

Another object is to provide such a device which is small, compact and inexpensive to manufacture.

Another object is the provision of such a device which is adapted to be readily applied to existing types of automotive vehicles.

Another object is the provision of such a device which is adapted to be driven from any suitable rotating part of the vehicle.

Another object is the provision of such a device which is adapted to be driven from any suitable rotating part of the vehicle power plant such as the generator shaft.

Another object is the provision of such a device which is adapted to be coupled directly to a rotating part of the vehicle without the use of intermediate transmission elements.

Another object is the provision of such a device which is adapted to be lubricated from the lubricating system of the vehicle.

Another object is the provision of such a device in which the brake-applying force exerted thereby is symmetrical with respect to the mounting and the operating elements thereof, so that the device is exceptionally strong and rigid.

Another object is the provision of such a device in which the brake-applying force is arranged to oppose the actuation of the controlling means.

Other objects and advantages of the device will be in part obvious and will become apparent to those skilled in the art from the following description taken in connection with the disclosure in the accompanying drawings, which illustrate a preferred embodiment of the present invention.

In the drawings—

Fig. 1 is a plan view of the chassis of a motor vehicle showing the location of the power brake mechanism, and the operating connections therefor;

Fig. 2 is an enlarged perspective view of the operating mechanism;

Fig. 3 is a longitudinal vertical section of the operating mechanism, with cooperating portions of the vehicle in elevation;

Fig. 4 is a rear elevation of the operating mechanism and cooperating parts;

Fig. 5 is a rear view of a second embodiment of the invention as applied to a rotating shaft of the vehicle power plant;

Fig. 6 is a longitudinal section taken substantially on the line 6—6 of Fig. 5;

Fig. 7 is a section on the line 7—7 of Fig. 6;

Fig. 8 is a longitudinal section similar to Fig. 3 of a slightly modified embodiment of the invention;

Fig. 9 is a longitudinal section similar to Fig. 6 of another modified embodiment of the invention, and Fig. 10 is a detail in section taken substantially on the line 10—10 of Fig. 8.

Referring first to Fig. 1 of the drawings, numeral 10 indicates the frame of a motor vehicle of any suitable construction, adapted to support the usual operating elements including an engine, not shown, a clutch 11, a transmission 12, drive shaft 13, and rear axle 14. The brake mechanism indicated generally at 15 comprises the usual hand brakes which are adapted to be operated from the hand lever 16 by means of suitable links 17 and 18 which are interconnected by means of the cross shaft 20 suitably journaled in the frame 10, and the service brakes which are adapted to be operated from the cross shaft 21 by means of suitable links 22 and levers 23 and 24.

The transmission casing 12 is adapted to house a change speed transmission gearing of any suitable type including a jack shaft 27 (Fig. 3) directly geared at its forward end to the engine clutch shaft, not shown. The jack shaft 27 is arranged to operate the drive shaft 13 of the vehicle in intermediate, low, or reverse gear by means of suitable well known gearing connections therebetween, one of which is indicated in Fig. 3 where numeral 25 indicates a gear connected to the drive shaft 13, and numeral 26 indicates a pinion fixed on or made integral with the jack shaft 27. The jack shaft 27 is rotatably mounted in the casing 12 in any suitable manner as by means of antifriction bearings 28.

According to the present invention the bearing 28 at the rear end of jack shaft 27 is mounted within an adapter sleeve 29 fitted within the bearing opening 30 of the transmission case 12 and extending rearwardly to form an annular spacing shoulder 31. A frame and casing member indicated generally by numeral 32 is adapted to be mounted upon the annular shoulder 31 and to be fixed to the transmission casing 12 in any suitable way as by means of the machine screws 33 and 34. It will be seen by reference to Fig. 3 of the drawings that the casing 32 extends upwardly between the transmission casing 12 and the housing 35 for the universal joint of drive shaft 13. The upper portion of housing 32 is therefore notched, as indicated at 36 in Fig. 2 of the drawings, in order that in assembling the device, the screws 34 may be started in the casing 12 and the housing 32 slid upwardly to engage beneath the heads of said screws, which are then tightened down thereon.

The end of the jack shaft 27 is internally threaded as indicated at 37 and is provided with driving lugs 38. A clutch member 39 having driving lugs 40 is adapted to be fixed in driving relation with the end of the jack shaft 27 by suitable means such as the screw 41 threaded within the end of the jack shaft and is provided with a plane friction surface 42. A complementary clutch member 43, provided with a friction surface 44, is fixedly mounted in any suitable manner upon a power member in the form of a shaft 45 which is suitably journaled in the casing 32 with freedom for longitudinal movement therein. The rear wall of casing 32 is provided with a bearing boss 46 on which is slidably mounted an antifriction thrust bearing 47 which is adapted to bear against the rear of clutch member 43 and control its frictional engagement with the clutch member 39. A light spring 48 is interposed between the back of casing 32 and a ring 48′ suitably fixed on shaft 45, to normally separate the friction surfaces 42 and 44.

Shaft 45 extends rearwardly through the bearing boss 46 and a packing ring 49 of any suitable character carried thereby, and is provided at the rear thereof with a pair of driving jaws 50. The casing 32 is provided with a pair of rearwardly extending frame members 51 (Fig. 2) which are joined at their rear ends by yoke member 52 integral therewith or suitably attached thereto. A cylindrical nut member 53 is journaled at one end within the yoke member 52 and extends forwardly into telescoping relation with an over-running clutch sleeve 50′ which has a unidirectional driving connection therewith through the clutch rollers 53′. Clutch sleeve 50′ is slidably mounted at its forward end on the shaft 45, and is connected for rotation therewith by any suitable means such as the pin 54 suitably fixed in the sleeve and engaging between the driving jaws 50 of shaft 45 to provide a longitudinally slidable rotary driving connection between the shaft and sleeve. Nut member 53 is provided with a circumferential rib 55 adjacent its rear end, and yoke member 52 is provided with an inwardly extending flange 56 which is adapted to cooperate with the rib 55 in preventing forward motion of nut member 53, while an antifriction thrust bearing 57 is suitably mounted within the yoke member 52 and is adapted to cooperate with the rib 55 to prevent rearward motion of the nut member 53. Suitable packing 56′ may be inserted around the rib 55 to retain lubricant for the thrust bearing.

Closure plate 58 is fixed in any suitable manner to the rear of the yoke 52 as by means of bolts 59 (Fig. 2) and is provided with a splined opening 60 surrounded by a boss 61 which is adapted to form a seat for the thrust bearing 57. An operating member in the form of a shaft 62 is threaded at its forward end to cooperate with the threaded nut member 53, and is provided rearwardly thereof with splines 63 which are adapted to engage in the splined opening 60 of the closure member 58 to prevent rotation of the shaft member. A yoke member 64 is fixed on the rear end of the shaft 62 in any suitable way as by means of the nut 65 and is provided with eyes 66 adapted to receive clevises 67. Links 68 are attached to the clevises 67 at one end in any suitable manner and extend rearwardly to crank members 69 fixed on cross shaft 21, the connection between links 68 and crank 69 being so arranged that forward motion of shaft 62 and yoke member 64 will cause the cross shaft 21 to be rotated in a direction to apply the brakes. A spring 70 is mounted between the yoke member 64 and the closure member 58 to normally maintain the yoke member 64 in its rearward position, and thus keep the brakes normally released.

A cross shaft 71 is journaled in suitable hangers 72 fixed to a cross frame member 73, and has freely journaled thereon a foot pedal 74. A yielding link member 75 extends rearwardly from the brake pedal and is adjustably attached in any suitable manner as by means of the bolt member 76 and nut 77 to the end of an operating arm 78 which is fixed on a cross shaft 79 journaled in the frame members 51 at the rear of the casing 32. Link member 75 is preferably formed by a coiled spring wound under considerable initial tension so that it acts ordinarily as an inextensible link, but is adapted to yield under slight additional pressure. A clutch operating member 80 is mounted centrally upon the cross shaft 79, having an opening 81 larger in diameter than the cross shaft so that the clutch operating member is free to swivel slightly thereon. A pin 82 is fixed within the clutch operating member in any suitable manner as by means of the cotter pin 83 and extends through an opening 84 in said cross shaft, thus forming a rigid keying connection between the cross shaft and the clutch operating member while allowing a slight swiveling motion therebetween.

The upper end of the clutch operating member 80 is bifurcated as indicated at 85 and 86, and a pair of thrust members 87 and 88 are slidably mounted in the frame members 51 and casing 32 to cooperate with the bifurcations 85 and 86 and bear against the rear of the thrust bearing 47, the arrangement being such that rotation of the crank shaft 79 in a clockwise direction (Fig. 3) will cause the thrust members 87 and 88 to press against the thrust bearing 47 and cause engagement between the clutch members 42 and 43. The freedom of operating member 80 to swivel slightly on shaft 79 allows the pressure of thrust members 87 and 88 to be evenly balanced, to cause even and uniform engagement of the clutch members.

Cross shaft 71 has fixed thereon in any suitable manner a collar 89 which is provided with an offset crank arm 90 which extends into the path of movement of the foot pedal 74. Cross shaft 71 also carries fixed thereon a crank arm 91 which is connected by means of a link 92 with a crank arm 93 fixed on the cross shaft 21 to cause the cross shafts 71 and 21 to rotate in unison. Ordinarily a slight space is left between the crank arm 90 and the foot pedal 74 so that the brake operating cross shaft 21 is normally actuated by the power operating device under the control of the foot pedal 74 by means of the link 75.

In operation, with the engine running and the clutch engaged, the jack shaft 27 will be rotated constantly in a counterclockwise direction (viewed from the front) through its gearing connection with the clutch shaft. The same is true when the vehicle is in motion and any of the transmission gears are meshed, whether the clutch is engaged or not, since the jack shaft 27 is always rotated in the same direction whether the vehicle is being driven forward or backward. If, now it be desired to apply the brakes, a slight pressure upon the foot pedal 74 will cause the link 75 to swing the lever 78 forwardly, thus causing the clutch operating member 80 to press upon the thrust members 87 and 88 and cause the engagement of the clutch surfaces 42 and 44 with a pressure proportional to the pressure upon the foot pedal 74. This frictional engagement will cause the rotation of clutch member 43, which is transmitted through the shaft 45, coupling 50, 54, over-running clutch 50', 53' to the hollow nut member 53. Since the threaded shaft 62 is prevented from rotation by means of its splined engagement with the member 58, it will be seen that rotation of the nut member 53 will cause longitudinal movement of the screw shaft 62. Since the screw and nut members are threaded in a left hand direction, rotation of the nut member 53 in a counterclockwise direction will cause the screw member 62 to be drawn forwardly within the nut member, compressing the spring 70, and drawing the yoke member 64 forwardly to swing the cross shaft 21 in a direction to apply the brakes. This brake applying force will vary substantially in proportion to variations of pressure upon the foot pedal 74, the multiplying factor being determined by the steepness of the threads of the screw and nut members, and by the design of the transmission elements. When the pressure upon the foot pedal 74 is released, the clutch members 39 and 43 are moved out of engagement by the spring 48. The clutch member 43 is then free to rotate backward, allowing the spring 70 to draw the screw shaft 62 rearwardly to its normal position, thus releasing the brakes. The threads on shaft 62 are sufficiently steep to be well beyond the angle of repose, so that the threaded connection is easily reversible to allow the retraction of the shaft.

Should it be desired to apply the brakes when the clutch is disengaged and the transmission gears are neutral, pressure is applied to the foot pedal 73 sufficient to stretch the link 75 and allow the foot pedal to come into contact with the crank 90 on the cross shaft 71 and cause the direct operation of the brakes through the link 92 and crank arm 93 fixed to the cross shaft 21. During this operation the over-running clutch 50', 53' will permit the hollow nut member 53 to overrun the shaft 45, thus allowing the screw shaft 62 to rotate the nut member 53 and move forward freely without interfering with the application of the brakes.

In Figs. 5, 6 and 7 of the drawings there is illustrated an embodiment of the invention which is particularly adapted to be driven from a rotating shaft of the engine of the motor vehicle such as the generator shaft. In Fig. 6 numeral 101 indicates the frame of a generator for a motor vehicle having a shaft 102 extending rearwardly therefrom. It is to be understood that shaft 102 is geared to the crankshaft of the motor vehicle engine by any suitable means not shown, and is constantly rotated during the operation of said engine.

A housing 103 having a closure portion 104 is mounted in any suitable manner on the bracket 105 as by means of cap screws 106, and bracket 105 is adapted to be fixed in any suitable way to the cylinder casting of the motor vehicle engine, or to any other conveniently adaptable base. A clutch member 107 is journaled within the closure member 104, being provided with thrust and radial bearings 108, 109, respectively, therein, and being retained in position by suitable means such as thrust collar 110, and is connected to rotate with shaft 102 by suitable keying means such as indicated at 111.

A screw shaft 112 is slidably mounted within the housing 103, and is prevented from rotation therein by splined engagement with a keying member 113 suitably fixed to the end of casing member 103 as by means of cap screws 114. A nut member 115 is threaded on the screw shaft 112 within the casing 103, and is provided at one end, integral therewith or suitably fixed thereto, with a clutch member 116 having a lining 117 arranged in proximity to the clutch surface of clutch member 107.

An anti-friction thrust member 118 is mounted upon a shoulder 119 on the rear face of clutch member 116, and a thrust ring 120 is arranged rearwardly thereof and adapted to cooperate therewith. A bifurcated lever 121 is journaled upon a bracket 122 on casing 103 by suitable means such as cross pin 123, fixed to lever 121 as by means of pins 124. The upper end of lever 121 is adapted to be connected in any suitable way with the brake pedal of the vehicle, in order to be operated thereby, and the lower end of lever 121 is provided with engaging arms 125 adapted to cooperate with thrust bars 126 slidably mounted in casing 103. Thrust bars 126 engage at their forward ends in slight depressions 127 in thrust ring 120, so that forward motion of arms 125 will be communicated through thrust bars 126 and thrust ring 120 to thrust bearing 118 to cause engagement between clutch members 116 and 107.

The sliding screw shaft 112 is connected to the brake mechanism by any suitable means such as a lever 128 pivoted at its upper end to a bracket 129 mounted on the side of the motor or any other suitable support. Screw shaft 112 is slidably pivoted to an intermediate portion of lever 128 by appropriate means such as a pin 130 carried by the shaft and traversing the slot 130' in said lever, and the lower ends of the lever have pinned thereto a link 131 adapted to operate the brakes in any usual or preferred manner.

In operation, the generator shaft 102 rotates constantly in one direction from the vehicle power plant. When it is desired to apply the brakes, pressure will be applied to the brake pedal, not shown, to swing the lever 121 in a rearward direction. This causes arms 125 to move clutch member 116 into engagement with clutch member 107 causing clutch member 116 to rotate and draw the threaded shaft 112 forwardly within the threaded portion 115 thereof. This forward motion of threaded shaft 112 is used to apply the brakes through lever 128 and link 131 in the usual manner, with a force which varies with the pressure of clutch member 116 upon clutch member 107.

It will be noted that since in this embodiment the nut member 115 is made unitary with clutch member 116, the tension set up in screw shaft 112 during the application of the brakes acts to release the pressure between clutch members 116 and 107 applied by lever arms 125. This reactive force is transmitted through the thrust bars 126 and lever 121 to the brake pedal, so that the operator is enabled to feel a certain fixed fraction of the actual brake applying force, the proportion of the force transmitted to the operator to the whole brake applying force depending upon the ratio of leverages employed. Upon release of the pressure upon the brake pedal by the operator, the usual brake releasing springs, not shown, move the screw shaft 112 rearwardly, first releasing the pressure between the clutch members 116 and 107, and then rotating clutch member 116 until threaded shaft 112 reaches its inoperative position.

It is to be understood that if it is deemed desirable in this embodiment of the invention the nut member and clutch member may be formed separately and the thrust of the nut member may be taken by means of a fixed thrust bearing as illustrated in Fig. 3 of the drawings. Conversely the nut member 53 and clutch member 43 of the first embodiment of the invention might be formed to move unitarily, while the thrust bearing 57 might be omitted in order that the operator might receive a fraction of the brake applying force as above described. Such modifications are illustrated in Figs. 8 and 9 of the drawings which correspond to Figs. 3 and 6 with the stated modification incorporated therein.

In Fig. 8, the parts illustrated are the same as in Fig. 3, and bear the same reference numerals, with the exceptions that the threaded nut member 53 is swivelled to the power shaft 45, and the thrust bearing 57 for the nut member is omitted. The swivelled connection between the nut member 53 and power shaft 45 may be of any suitable form, and in this case is represented by registering grooves within the two overlapping portions of said members, and an expansible thrust ring 45' having a running fit within said groove. It will be seen that in this structure, as in the structure illustrated in Fig. 6, the brake applying forces set up in the screw shaft 63 tend to release the pressure between the clutch members 39 and 43. Thus the operator feels the actual reaction of the brake-applying forces through the thrust members 87 and 88, and levers 85 and 78.

In the structure shown in Fig. 9, the parts are generally arranged and enumerated the same as in Fig. 6. However, in the present embodiment, the clutch member 116 is splined upon the nut member 115 instead of being formed integral therewith. Motion of the clutch member 116 through contact with rotating clutch member 107 will therefore take place independently of the nut member 115. A clutch releasing spring 116' may be mounted on nut member 115, bearing against an abutment 115' on said nut member and against the face of clutch member 116.

The brake-operating forces set up in the screw shaft 112 are in this case adapted to be taken by a thrust bearing 132 located between the end of nut member 115 and a shoulder 133 of housing 103.

Although certain preferred embodiments of the invention have been shown and described in detail, it is to be expressly understood that the illustrated embodiments are not exclusive, and various other embodiments will now suggest themselves to those skilled in the art, while changes may be made in the construction, arrangement and proportion of parts, and certain features used without other features, without departing from the spirit of the invention. Reference is therefore to be had to the claims hereto appended for a definition of the limits of the invention.

What is claimed is:

1. In combination with a vehicle having a casing and a rotating shaft therein, brake operating means having a power shaft adapted to be driven directly by said rotating shaft, means continuously under the control of the operator for establishing a variable torque direct driving connection between the rotating shaft and the power shaft, a threaded nut member connected to rotate with the power shaft, a nonrotatable threaded operating member cooperating with the nut, and connections between the threaded operating member and the brakes to operate the latter.

2. In combination with a vehicle having a casing and a rotating shaft therein, brake operating means having a power shaft adapted to be driven directly by said rotating shaft, means continuously under the control of the operator for establishing a variable torque direct driving connection between the rotating shaft and the power shaft, a threaded nut member connected to rotate with the power shaft, a nonrotatable threaded operating member cooperating with the nut, connections between the threaded operating member and the brakes to operate the latter, and means yieldably retaining the operating member in normal position.

3. In an automotive vehicle having a change speed transmission including a rotatable jack shaft, power brake operating mechanism including a power member, variable torque transmission means between the jack shaft and power member continuously under the control of the operator, an operating member for the brakes, and a threaded connection between the power member and operating member including cooperating screw and nut elements, one of which elements is rigidly connected to one of said members and the other of which elements is swivelled to the other member and has a one-way rotary driving connection therewith.

4. In an automotive vehicle having a change speed transmission including a rotatable jack shaft, power brake operating mechanism including a power member, variable torque transmission means between the jack shaft and power member including a driving clutch member rigidly mounted on the jack shaft, a complementary clutch member rigidly mounted on the power member and manual control means for moving the power member with its clutch member longitudinally to energize the driving clutch member, an operating member for the brakes, and a threaded connection between the power member and operating member.

5. In a brake operating mechanism, a force applying unit including a nonrotatable longitudinally displaceable screw shaft, a rotatable nut member cooperating therewith, a rotating part, and means for adjusting the nut endwise to establish a driving relation with said part.

6. In a brake operating mechanism, a force applying unit including a nonrotatable longitudinally displaceable screw shaft, a rotatable nut member cooperating therewith, a rotating part, means for adjusting the nut endwise to establish a driving relation with said part, said parts being so arranged that rotation of the nut by the rotating part will move the screw shaft in the same direction that the nut was moved to establish the driving relation.

7. In a brake operating mechanism for motor vehicles, a nonrotatable longitudinally displaceable screw shaft adapted to operate the brakes, a rotatable nut member cooperating therewith, a power member adapted to be continuously rotated in one direction during the operation of the vehicle motor, and means under the control of the operator for establishing a variable torque driving connection between the power member and the nut and for controlling the longitudinal position of the nut.

8. Brake operating mechanism including a power unit adapted to be operated from a rotating part, connections between the power unit and the brakes to operate the latter, manual control means for the power unit, said connections and control means being so arranged that the reaction of the brake-applying force exerted by the unit is applied to the control means in a direction to cause the release of the brakes.

9. In a brake operating mechanism, a force-multiplying unit including a non-rotatable longitudinally displaceable screw shaft, a nut member coacting therewith, the pitch of the threads on said screw and nut being so steep that longitudinal pressure on the shaft will rotate the nut, means for rotating said nut member including an overrunning clutch, means for limiting longitudinal movement of the nut in both directions, brake mechanism, and operative connections between said shaft and said brake mechanism.

10. Brake operating mechanism including a power unit adapted to be operated from a rotating part, connections between the power unit and the brakes to operate the latter, manual control means for the power unit, said connections and control means being so arranged that a fraction of the reaction of the force exerted by the unit in applying the brakes is transmitted to the operator through the manual control means.

11. Power brake operating mechanism comprising a power unit including an extensible and contractable connection, manually controlled means for moving said connection in a direction for applying the brakes, and power means controlled by such movement for operating the power unit to contract said connection and thereby apply the brakes.

12. In a brake operating mechanism, manually operable control means, brake actuating linkage, means connecting the manual control means to the brake actuating linkage including an extensible and contractible connection, and power means continually under the control of the manual control means for operating said connection.

13. In a brake operating mechanism, manually operable control means, brake actuating linkage, means connecting the manual control means to the brake actuating linkage including an extensible and contractible connection, and power means for contracting said connection, brought into operation by movement of the control means in a direction to apply the brakes.

14. A force-multiplying brake operating mechanism for motor vehicles including a power actuating member, manual controlling means for the power member and connections between the power member and the controlling means for causing a portion of the brake applying forces exerted by the power actuating member to react against the manual controlling means.

15. A force-multiplying brake operating mechanism for motor vehicles including a power actuating member, manual controlling means for the power member and connections between the power member and the controlling means for balancing the forces exerted on the controlling means against a factor of the brake applying forces exerted by the power actuating member.

16. A force-multiplying brake operating mechanism for motor vehicles including a power member driven from a rotating part of the vehicle, brake operating means adapted to be actuated thereby, manually controlling means for the power member and connections between the power member and the controlling means for balancing the forces exerted on the controlling means during forward braking against a factor of the brake applying forces exerted by the power actuating member.

FREDERICK HATHAWAY RAGAN.